United States Patent [19]

Brewster

[11] Patent Number: 4,553,337
[45] Date of Patent: Nov. 19, 1985

[54] THREAD GAUGE FOR MEASURING THREAD PITCH DIAMETERS

[76] Inventor: Albert L. Brewster, R.R. 2, Box 190A, Pleasant Hill, Mo. 64080

[21] Appl. No.: 568,837

[22] Filed: Jan. 6, 1984

[51] Int. Cl.$^4$ .............................................. G01B 3/40
[52] U.S. Cl. .............................. 33/199 R; 33/147 M
[58] Field of Search ............ 33/199 R, 147 M, 143 M

[56] References Cited
U.S. PATENT DOCUMENTS
2,941,304   6/1960   Man ................................. 33/199 R FOREIGN PATENT DOCUMENTS
572623   3/1933   Fed. Rep. of Germany .... 33/199 R Primary Examiner—Willis Little
Attorney, Agent, or Firm—Kokjer, Kircher, Bradley, Wharton, Bowman & Johnson

[57] ABSTRACT

A thread gauge which attaches to a vernier caliper to measure the thread pitch diameter of both externally threaded and internally threaded parts. A pair of anvils are externally threaded with threads having the same pitch as those of the threaded part. Each anvil is mounted on a stem having a ball on which the anvil can rotate to properly mate with the parts to which the anvils are applied. The stems are detachably secured to the caliper blades by attachment collars having keyhole openings for receiving the stems and caliper blades. A set screw is used to secure each collar on its caliper blade.

17 Claims, 2 Drawing Figures

THREAD GAUGE FOR MEASURING THREAD PITCH DIAMETERS

The Government has rights in this invention pursuant to Contract No. DE-AC04-76DP00613 awarded by the U.S. Department of Energy.

BACKGROUND OF THE INVENTION

This invention relates generally to the measurement of thread pitch diameters and deals more particularly with a gauge for measuring the pitch diameters on both externally threaded and internally threaded parts.

In the manufacture of threaded parts, the pitch diameter must be measured to assure that the threaded parts have the proper pitch diameter and also in inspection operations to check the pitch diameter of the finished parts. Measurement of the pitch diameter of externally threaded parts can be performed by threaded micrometers which are available in sizes capable of measuring pitch diameters up to three inches. Thread ring gauges and thread plug gauges are go and no-go types of measuring tools having standard sizes for use in measuring standard pitch diameters. Thread pitch wires are also available for use with an outside micrometer, although their use is somewhat cumbersome in that both hands are needed for handling of the thread micrometer and the three wires that are required.

Measurement of the pitch diameter of an internally threaded part is particularly difficult and presents even more of a problem if the threads are specially designed, nonstandard threads. It has been common practice to measure inside pitch diameters by building a special thread plug gauge which is useful for only a single purpose. Delays and significant cost increases are encountered if a large number of nonstandard threads are manufactured.

Special thread gauges have been proposed, as shown by U.S. Pat. No. 2,941,304 to Man, U.S. Pat. No. 4,202,109 to Schasteen, and U.S. Pat. No. 3,111,766 to Bryant. All of these devices are unduly complex and suffer from problems relating to accuracy and versatility. For example, the device of Bryant can measure only external threads, while the Schasteen device requires a complicated dovetail joint and clip arrangement for slidably mounting each of the three gauge assemblies on the blades of a vernier caliper. The gauging rolls shown in the Man patent likewise require complicated clamp devices to attach them to the caliper blades. The Man arrangement also involves the use of helical spring coils for measuring the thread diameter rather than measuring by direct contact of the gauge rolls with the threaded part.

SUMMARY OF THE INVENTION

The present invention provides an improved thread gauge which is capable of accurately measuring the pitch diameter of both externally and internally threaded parts having virtually any size. In accordance with the invention, externally threaded anvils are attached to the measuring blades of a vernier caliper. The caliper blades are adjusted to engage the anvils against the threads of an internally or externally threaded part. The thread pitch of the anvils is the same as the thread pitch of the threaded part, so the anvil threads mate exactly with the threads which are being measured to provide an accurate measurement of the pitch diameter of the part.

It is a particularly important feature of the invention that each anvil is mounted to turn about a ball and socket joint so that its threads can properly mate with the threads of the threaded part that is undergoing measurement. The ball and socket joints are formed by balls which fit in dual diameter bores extending axially through the anvils. A stem extends from each ball through the smaller upper portion of the bore to permit the anvils to be attached to the caliper blades by attachment collars.

The mounting arrangement for the anvils is another important feature of the invention. The attachment collars have keyhole openings which receive the projecting stems and the tips of the caliper blades. Each collar is attached to its caliper blade by a set screw which can be tightened against the stem to secure it against the adjacent tip portion of the caliper blade. By virtue of this attachment system, the anvils can be quickly and easily mounted on the caliper blades at known positions so that the threaded measurements can be accurately made. At the same time, the anvils and other parts can be quickly and easily removed when a different set of anvils is to be used or when the vernier caliper is to be used without the anvils.

DETAILED DESCRIPTION OF THE INVENTION

Figure 1:
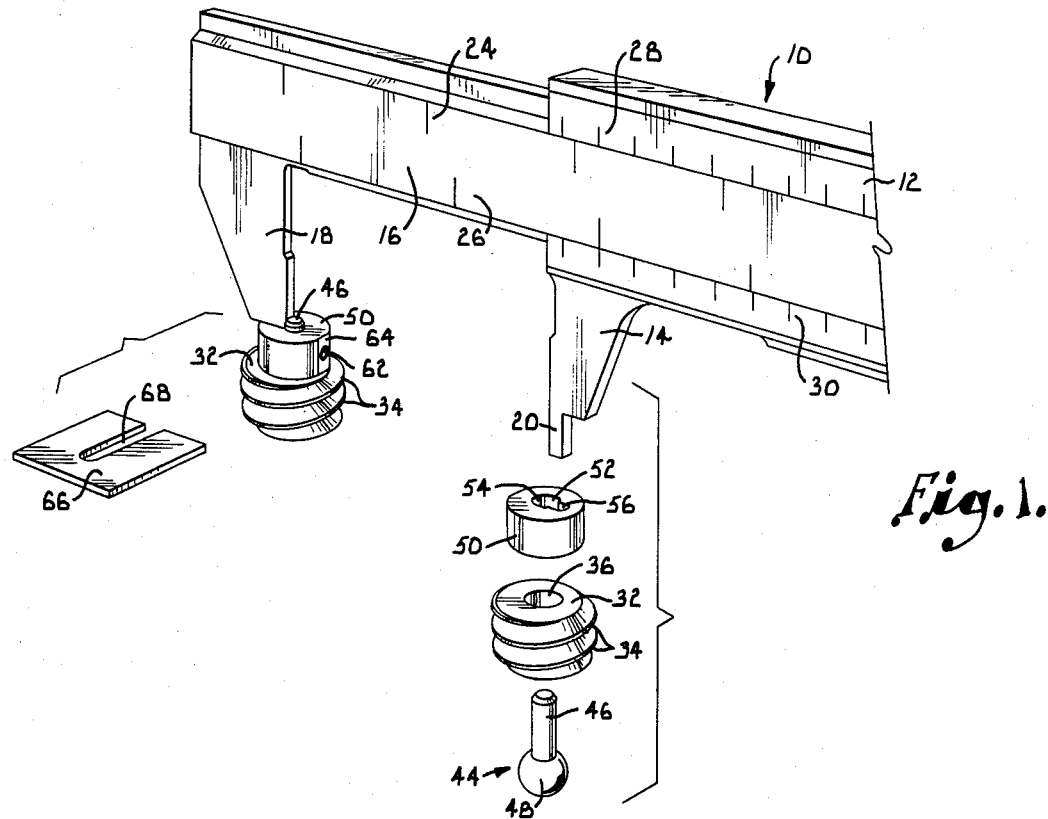
Figure 2:
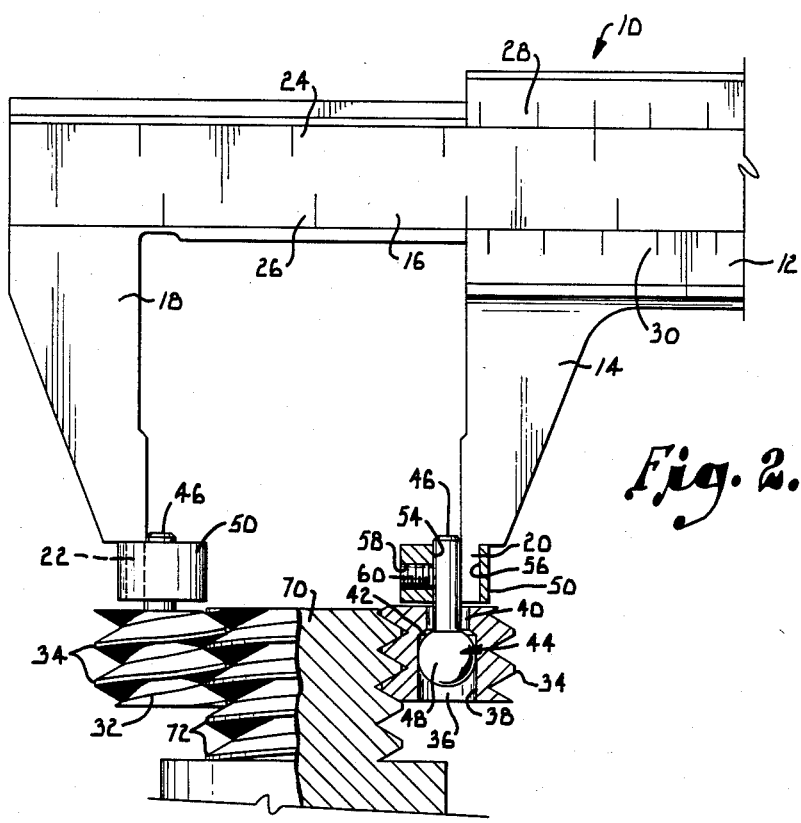

In the accompanying drawing which forms a part of the specification and is to be read in conjunction therewith and in which like reference numerals are used to indicate like parts in the various views:

FIG. 1 is a perspective view showing a vernier caliper equipped with the thread gauge arrangement of the present invention, with one of the anvil assemblies shown in exploded form and the caliper shown only fragmentarily; and FIG. 2 is a fragmentary side elevational view of the caliper showing parts of the thread gauge attached to each of its blades, with a portion of one anvil assembly shown in cross-section.

Referring now to the drawing in more detail, the thread gauge of the present invention is used with a conventional vernier caliper which is generally designated by numeral 10. The caliper 10 includes a main body 12 having a fixed blade 14. A sliding rule 16 having a moving blade 18 can be extended and retracted relative to the main body 12 to move the blades apart and together. The blades 14 and 18 terminate in respective tip portions 20 and 22. The rule 16 has an upper scale 24 which is the main scale used in the measurement of inside dimensions. A lower scale 26 on the rule serves as the main scale for measurement of outside dimensions. The body 12 is provided with upper and lower scales 28 and 30 which are vernier scales for inside and outside dimensions, respectively.

In accordance with the present invention, a thread gauge for measuring thread pitch diameters includes a pair of externally threaded rolls or anvils 32 which are identical to one another. Each anvil 32 is a cylindrical member having spiral external threads 34. The pitch of each thread 34 is the same as the pitch of the threads on the threaded part which is to be measured. Accordingly, a number of sets of anvils are provided, with each set having threads with a different pitch for measuring different leads.

As shown in FIG. 2, each anvil 32 has an axial bore 36 extending through the anvil from top to bottom. The lower portion 38 of each bore is somewhat larger in diameter than the upper portion 40 of the bore. The lower and upper bore portions 38 and 40 are connected by a tapered transition portion 42.

A tooling ball 44 is provided for each anvil 32. Each tooling ball includes a cylindrical stem 46 projecting from a spherical ball 48. The balls 48 are substantially equal in diameter to the lower bore portions 38, while the stems 46 are somewhat smaller in diameter than the upper bore portions 40. The balls 48 are fitted in the lower bore portions 38 with the stems 46 projecting through the upper bore portions 40 and well above the anvils 32. The tapered bore portions 42 provide seats for the balls 48.

A pair of attachment collars 50 serve to attach the anvils 32 to the blades 14 and 18 of the vernier caliper 10. The collar 50 are identical, and each is provided with a keyhole shaped opening 52 extending through the collar from top to bottom. Each opening 52 has a generally circular portion 54 which is substantially equal in diameter to the stems 46. A slot portion 56 of each opening 52 is equal in size to the tips 20 and 22 of the caliper blades.

An internally threaded passage 58 is formed in each collar 50 and extends from one side of the collar to the circular portion 54 of the keyhole opening 56. A set screw 60 is received in each threaded passage 58. Each set screw 60 has an opening 62 (see FIG. 1) in its outer end for receiving a tool such as a hex key (not shown). The outside surface of each collar 50 may be flattened at 64 in the area of the threaded passage 58.

A gauge plate 66 serves to maintain a gap between each anvil 32 and the corresponding attachment collar 50. The gauge plate 66 is preferably a metal plate having a thickness at least equal to one half the pitch of the threaded parts that are measured by the thread gauge. A slot 68 is formed in the gauge plate 66 to accommodate the stem 46 when the gauge plate is interposed between the anvil and collar.

In use, the thread gauge of the present invention serves to provide a measurement of the pitch diameter of threaded parts such as the externally threaded part 70 shown in FIG. 2. Spiral threads 72 are formed externally on the part 70. The pitch of the anvil threads 34 is the same as the pitch of the threads 72.

The thread gauge is used by first applying the tooling balls 44 to the anvils 32. The tooling balls are applied by inserting the stems 46 into the bottom portions of the bores 36 until the stems project upwardly above the anvils and the balls 48 are seated against the tapered surfaces of the transition portions 42 of the bores. The projecting stems 46 are then inserted into and through the circular portions 54 of the attachment collars 50. Next, the attachment collars 50 are applied to the caliper blades 14 and 18 by fitting the slot portions 56 of the keyhole openings on the blade tips 20 and 22. The set screws 60 can then be tightened in the threaded passages 58 against the stems 46 to secure the stems against the adjacent caliper blade tips, thereby securing the attachment collars 50 on the caliper blades to mount the threaded anvils 32 thereon.

In order to maintain a gap between each anvil 32 and collar 50, the gauge plate 66 is interposed between the collar and anvil prior to tightening of the set screw 60. The gauge plate 66 thus assures that the space between each collar and the underlying anvil has a width at least equal to one half of the pitch diameter of the threads 34.

When the anvils 32 have been applied in this manner to the caliper blades 14 and 18, measurements can be taken by applying the anvils to threaded parts such as the externally threaded part 70. The pitch diameter measurement is taken by sliding rule 16 inwardly until the two anvils 32 are engaged with the threads 72 at diametrically opposed locations. Since threads 34 and 72 have the same pitch, the anvil threads 34 exactly mate with the threads 72 in direct contact therewith, as shown in FIG. 2. Threads 34 fit closely into the grooves formed between thread 72, while thread 72 fit closely in the grooves formed between the threads 34 on each anvil.

The ball and socket joint formed between each stem 46 and the corresponding anvil 32 is important in assuring that the anvils are properly applied to the threaded parts for accurate measurement. Each anvil 32 is able to rotate about the ball 48 with respect to the stem axis. Thus, if the peaks or other portions of the threads 34 and 72 should contact one another during application of the anvils to the threaded part, the anvil is able to rotate about the ball to the proper angle for exact mating with the threads 72. This rotation of the anvils occurs automatically as they are applied to the threaded part.

When the anvils 32 rotate on balls 48 during application to the threads 72, the anvils ride upwardly on stems 46. At most, the anvil will turn one half of a revolution and will ride up a distance equal to one half of the thread pitch. Consequently, the gauge plate 66 should be used to assure that each anvil is capable of moving upwardly one half of the thread pitch before being stopped by the collar 50.

The thread gauge can also be used to measure the pitch diameter of internally threaded parts. In this situation, the blades 14 and 18 are closed sufficiently to permit the two anvils 32 to be inserted into the part. Then, the blades 14 and 18 are opened until the anvil threads 34 mate with the threads of the internally threaded part. Again, the ability of anvils 32 to rotate on balls 48 allows the anvil threads to properly mate with the internal threads on the part that is undergoing measurement.

When the thread gauge has been applied in the manner indicated to an externally threaded part, the pitch diameter of the part is equal to the measurement indicated by the scale 26 and the cooperating vernier scale 30, plus a number equal to the scale reading when the caliper blades 14 and 18 are closed to position the anvils 32 against one another with their threads 34 mating.

In measuring the pitch diameter of an internally threaded part, the pitch diameter is equal to the measurement indicated on scale 24 and the cooperating vernier scale 28, plus a number equal to twice the anvil pitch diameter minus the scale reading on scales 24 and 28 when the blades 14 and 18 are closed to position anvils 32 against one another with the anvil threads 34 mating. Since the anvil pitch diameter is known, the number which must be added to the measurement provided by the vernier scales can be determined for each different set of anvils, and the actual pitch diameter of the part can be readily determined.

The anvils can be quickly and easily attached to the caliper blades simply by applying them to the tip 20 and 22 and tightening the set screws 60, preferably with the gauge plate 66 interposed between the anvils and collars to provide the necessary gap. The anvils and other parts of the thread gauge can be removed from the caliper simply by loosening the set screw 60 and detaching the collars 50 from the blade tips. The anvils in each different set preferably have identical bores 36 so that the same tooling balls 44 and attachment collars 50 can be used to attach each set of anvils to the vernier caliper.

The thread gauge of the present invention can be used to measure outside pitch diameters on parts having virtually any size. The only limitation is the extent to which the caliper blades 14 and 18 can be opened. So long as the pitch diameter of an internally threaded part is at least equal to twice the pitch diameter of the anvils 32, the pitch diameter of the part can be measured by the threaded gauge.

Measurement of pitch diameters involves application of the anvils directly to the threaded parts and into direct contact with the threads and without the need for spiral wires or other accessories. The mounting arrangement for the anvils clamps the stems 46 directly against the tips 20 and 22 of the caliper blades so that the stems are at predetermined locations with respect to the blades, thereby assuring accuracy of the measurements. I have found that my thread gauge can measure nonstandard parts to an accuracy of within 0.003 inch. Virtually any type of thread can be measured, including acme threads and buttress threads.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A thread gauge device attachable to a measuring instrument having a pair of blades for use in measuring the pitch diameter of a threaded part, said device comprising:
   a pair of anvils each presenting external threads having substantially the same pitch as the threads on the threaded part;
   a stem for each anvil;
   a ball and socket connection between each stem and the corresponding anvil, said anvils being rotatable about said connections so that each anvil can become skewed on its stem to permit the external threads on the anvils to mate in direct mating contact with the threads on the threaded part when the anvils are applied to the part for measurement of the pitch diameter thereof;
   means for connecting said stems to the blades of the measuring instrument to mount each anvil at a predetermined location relative to the corresponding blade for accurate measurement of the pitch diameter of the threaded part; and
   means for spacing each connecting means away from the corresponding anvil by a distance equal to one-half the pitch of the threaded part.

2. A device as set forth in claim 1, wherein each ball and socket connection includes:
   a ball element on each stem; and
   a bore extending through each anvil, each bore having an upper portion with a diameter less than the ball element and a lower portion with a diameter greater than the upper portion, said ball elements being received in the lower bore portions of the anvils with said stems extending through the upper bore portions.

3. A device as set forth in claim 2, wherein said connecting means includes:
   a collar for each stem, said collars receiving said stems and being applicable to the blades of the measuring instrument; and
   fastening means for detachably securing each collar to the corresponding stem and blade to detachably secure the stems to the blades.

4. A device as set forth in claim 3, wherein said fastening means comprises a set screw threaded into each collar, said set screws being adapted to be tightened against the stems to secure the stems to the blades.

5. A device as set forth in claim 1, wherein said connecting means detachably connects said stems to the blades of the measuring instrument.

6. A device as set forth in claim 1, wherein said connecting means acts to detachably clamp said stems to the blades of the measuring instruments.

7. A device as set forth in claim 1, wherein said connecting means includes:
   an attachment collar for each stem, each collar having an opening therein for receiving the stem and blade adjacent one another; and
   detachable means for securing each stem and blade adjacent one another in the opening of the corresponding collar.

8. A device as set forth in claim 7, wherein said detachable means includes a set screw for each collar, said set screws having threaded connections with the collars and being threadable against the stems to detachably secure the stems and blades together in the openings of the attachment collars.

9. A device as set forth in claim 7, wherein said spacing means comprises a gauge plate for spacing each collar away from the corresponding anvil a distance equal to the thickness of the gauge plate.

10. A device as set forth in claim 9, wherein the thickness of said gauge plate is at least as great as one half the pitch of the threads on said anvils.

11. In combination with a caliper having a fixed blade and a sliding blade, a thread gauge for measuring the pitch diameter of a threaded part, comprising:
    a pair of cylindrical anvils each presenting external spiral threads having the same pitch as the threads on the threaded part, said anvils being applicable directly to the threaded part with the threads of the anvils directly contacting and mating with the threads of the threaded part at diametrically opposed locations thereon to gauge the pitch diameter of the part;
    a bore extending through each anvil at a location centered on the axis thereof, each bore defining a ball socket therein;
    a stem for each anvil fitting in the bore thereof and carrying a ball which is received in the ball socket in a manner to mount the anvil on the stem for movement about the ball to permit the anvils to rotate and to become skewed on their stems during application to the threaded part so that the threads of the anvils can mate with the threads of the part in direct contact therewith, each stem projecting from the corresponding anvil;
    means for detachably connecting the projecting stems to the fixed and sliding blades of the caliper with each stem at a preselected location relative to the blade to which it is connected, whereby the sliding blade can be moved to move the anvils against diametrically opposed portions of the threaded part for measurement of the pitch diameter thereof; and means for spacing each connecting means away from the corresponding anvil by a distance equal to one-half the pitch of the threaded part.

12. The invention of claim 11, wherein said detachable connecting means includes:

a collar for each stem fitting detachably thereon and adapted to receive the corresponding blade of the caliper; and fastening means for detachably securing each collar to the corresponding stem and blade.

13. The invention of claim 12, wherein said spacing means comprises a gauge plate for insertion between each anvil and the corresponding collar to maintain a gap equal to the thickness of the gauge plate between each anvil and the corresponding collar.

14. The invention of claim 13, wherein the thickness of said gauge plate is at least one half the pitch of said external spiral threads.

15. A thread gauge assembly for use with a caliper having a pair of relatively adjustable blades to measure the pitch diameter of a threaded part, said thread gauge assembly comprising:

a pair of cylindrical anvils each presenting external spiral threads having substantially the same pitch as the threads of the threaded part to mate therewith, each anvil having an anvil bore with upper and lower bore portions, the diameter of each lower bore portion being greater than the diameter of the corresponding upper bore portion;

a pair of ball elements in the respective lower bore portions;

a stem extending from each ball element through the upper bore portion and away from the anvil, said anvils being freely movable about said ball elements;

a collar on each projecting stem, said collars being applicable to the blades of the caliper to locate each stem at a predetermined position relative to the corresponding blade;

means for detachably securing each collar to the corresponding stem and caliper blade to mount the anvils on the blades for application of the anvils to the threaded part to measure the pitch diameter thereof, said anvils being carried on the ball elements in a manner to rotate about the stem axes and to become skewed on the stems to permit the threads of the anvils to mate in direct mating contact with the threads of the threaded part; and means for spacing each collar means away from the corresponding anvil by a distance equal to one-half the pitch of the threaded part.

16. The invention of claim 15, wherein each collar presents a generally keyhole shaped opening therethrough having a generally round portion for receiving the stem and a slot portion for receiving the blade of the caliper.

17. The invention of claim 16, wherein said detachable securing means comprising a set screw threaded into each collar to the keyhole shaped opening thereof to secure the stem in said round portion and the blade in the slot portion.

* * * * *